United States Patent
Zhang et al.

(10) Patent No.: US 8,250,640 B1
(45) Date of Patent: Aug. 21, 2012

(54) TRANSPARENT KERBOROS DELEGATION WITH A STORAGE VIRTUALIZATION SYSTEM

(75) Inventors: Yuan Zhang, Shanghai (CN); Zhaohui Guo, Shanghai (CN); Ming Yang, Shanghai (CN); Philip Love, Alhambra, CA (US); Mario Wurzl, Westborough, MA (US); Mingzhou Sun, Northborough, MA (US)

(73) Assignee: EMC Corporation, Hopkinton, MA (US)

( * ) Notice: Subject to any disclaimer, the term of this patent is extended or adjusted under 35 U.S.C. 154(b) by 656 days.

(21) Appl. No.: 12/483,993

(22) Filed: Jun. 12, 2009

Related U.S. Application Data

(63) Continuation-in-part of application No. 11/906,026, filed on Sep. 28, 2007, and a continuation-in-part of application No. 12/001,149, filed on Dec. 10, 2007.

(51) Int. Cl.
*G06F 7/04* (2006.01)
(52) U.S. Cl. ............................ 726/10; 726/5
(58) Field of Classification Search .................. 726/10, 726/5
See application file for complete search history.

(56) References Cited

U.S. PATENT DOCUMENTS

| | | | |
|---|---|---|---|
| 2006/0137001 A1* | 6/2006 | Foster et al. | 726/10 |
| 2007/0078982 A1* | 4/2007 | Aidun et al. | 709/225 |
| 2007/0199056 A1* | 8/2007 | Bhatia et al. | 726/8 |
| 2009/0006710 A1* | 1/2009 | Daniel et al. | 710/315 |
| 2009/0073895 A1* | 3/2009 | Morgan et al. | 370/255 |
| 2010/0057949 A1* | 3/2010 | Weber | 710/22 |

* cited by examiner

*Primary Examiner* — Krisna Lim
(74) *Attorney, Agent, or Firm* — Dergosits & Noah LLP; Todd A. Noah

(57) ABSTRACT

The invention is a system and method for ensuring that a storage virtualization system performs as a trusted delegate for a user attempting to access data on an authenticated server. Data is moved from a first server to a second server by a storage virtualization system. Even though the user may have been authenticated to access the first server, the storage virtualization system which re-directs user requests to the migrated data on the second server may not be authenticated. The first time a user is re-directed to the second server, the storage virtualization system will obtain request to act as a trusted delegate for the user by communicating with a third server, such as a Kerberos domain controller. After the storage virtualization system is properly authenticated as a trusted delegate for the user, future re-directed requests will be seamless and transparent to the user.

15 Claims, 3 Drawing Sheets

TRANSPARENT KERBOROS DELEGATION WITH A STORAGE VIRTUALIZATION SYSTEM

CROSS-REFERENCE TO RELATED APPLICATIONS

This application is a continuation-in-part of co-pending U.S. patent application Ser. No. 11/906,026, entitled "CROSS DOMAIN DELEGATION BY A STORAGE VIRTUALIZATION SYSTEM," filed on Sep. 28, 2007; and co-pending U.S. patent application Ser. No. 12/001,149, entitled "AUTHENTICATED SERVICE VIRTUALIZATION," filed on Dec. 10, 2007; all of which are incorporated in full herein.

FIELD

The invention relates generally to storage virtualization systems, and specifically, to a system and method for user account authentication and delegation during file re-direction by a storage virtualization system.

BACKGROUND

Storage virtualization is commonly used to relocate data from a first server to a second server without disturbing client access to either server. An administrator may use a storage virtualization system (also known as a file virtualization appliance or service virtualization device) to migrate data in order to upgrade, replace, or backup the first server, or for any other reasons that require copying or movement of data from a first server to a second server. After completing data migration from the first server to the second server, users attempting to access data originally located on the first server will be automatically and transparently re-directed to the migrated data the second server. The storage virtualization system will act as an intermediary or bridge between the user's computer (or client), the first server and the second server. Transparent re-direction is desirable so that IT administrators do not have to notify each and every user every time there is server maintenance, and users do not notice any disruption when accessing the server.

A storage virtualization system is designed to perform its tasks of copying, migration and re-direction with little impact to the user. However, in some cases, even though data may be successfully migrated from a first server to a second server, user access privileges may not migrate. This may occur when the first server requires user account authentication by a third party prior to allowing access to data stored on the first server. For example, access to the first server may require Kerberos authentication of the client. After this data is migrated to the second server, requests from the user's client computer are re-directed by the storage virtualization system, which may not have been authenticated for access to this data. As a result, after migration, user re-direction to the second server may fail, disrupting user access to data stored on the second server. What is therefore needed is a way for the storage virtualization system to act as a trusted, authenticated delegate for the user, so that the storage virtualization system can access the user's data on the second server on the user's behalf. What is also needed is a way for the storage virtualization system to perform delegation transparently, so that access to the user's data is not disrupted.

BRIEF DESCRIPTION OF THE FIGURES

The invention is illustrated by way of example and not limitation in the figures of the accompanying drawings, in which like references indicate similar elements, and in which.

DETAILED DESCRIPTION

Figure 1:
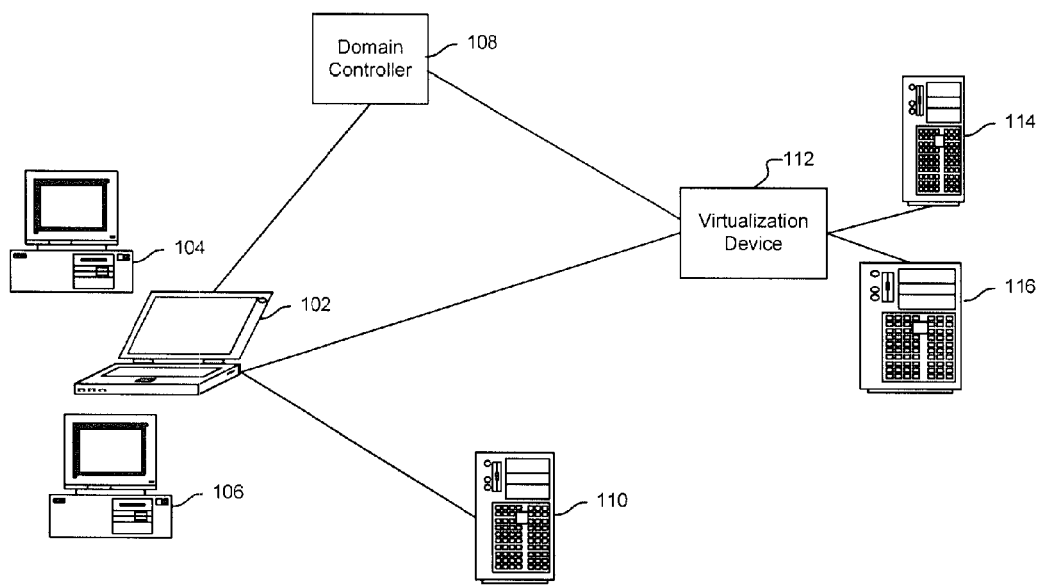
FIG. 1 is an exemplary block diagram depicting an embodiment of the invention.

The invention is a system and method for continuing user account access to data that has been migrated from a first server to a second server by a storage virtualization system, even if access to the second server requires user account authentication by a third party. Specifically, the invention is a method for designating the storage virtualization system as a trusted delegate for the user. As a result of performing the method of the invention, the storage virtualization system will be authorized to transparently forward requests from the user to the second server, thereby ensuring seamless re-direction and access to the second server without disrupting the user's access to his migrated data on the second server. Additionally, since the re-direction and delegation are transparent, an administrator using a storage virtualization services will not have to notify users of possible network interruptions. The invention provides an alternative to authenticated service virtualization that relies upon a "secret key" for both the first and second servers, as is disclosed in U.S. patent application Ser. No. 12/001,149, which is incorporated in full herein. The invention also differs from the cross-domain delegation method disclosed in U.S. patent application Ser. No. 11/906, 026, also incorporated in full herein.

It should be appreciated that the present invention can be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

In the context of this document, a computer usable medium or computer readable medium may be any non-transitory medium that can contain or store the program for use by or in connection with the instruction execution system, apparatus or device. For example, the computer readable storage medium or computer usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, infrared, optical, or electrical system, apparatus or device for storing information, excluding transitory propagating signals. Alternatively or additionally, the computer readable storage medium or computer usable medium may be any combination of these devices or another suitable medium upon which the program code is printed, as the program code can be electronically captured, via, for instance, optical scanning of the medium, then compiled, interpreted, or otherwise processed in a suitable manner, if necessary, and then stored in a computer memory.

Applications, software programs or computer readable instructions may be referred to as components or modules. Applications may be hardwired or hard coded in hardware or take the form of software executing on a general purpose computer such that when the software is loaded into and/or executed by the computer, the computer becomes an apparatus for practicing the invention. Applications may also be downloaded in whole or in part through the use of a software development kit or toolkit that enables the creation and implementation of the present invention. In this specification, these implementations, or any other form that the invention may take, may be referred to as techniques. In general, the order of the steps of disclosed processes may be altered within the scope of the invention.

A. System Architecture

FIG. 1 is a block diagram illustrating an example of how a storage virtualization system may be connected to one or more clients and one or more servers. The nodes shown in FIG. 1 may be connected in a variety of ways, such as via a public or private network and/or combination thereof, and may include the Internet, an intranet, LAN, WAN, or other forms of connecting multiple systems and/or groups of systems together.

Clients 102-106 are used to access data stored on one or more servers, such as servers 110, 114, and 116. In order to access any one of those servers, a user (e.g., using client 102) must be authenticated. In various embodiments, domain controller 108 is configured to receive from client 102 a request for a Kerberos ticket that can be used to authenticate a user to a server. If the user presents the appropriate username and password, domain controller 108 issues the ticket to client 102.

In some embodiments, domain controller 108 supports the Kerberos protocol and performs the tasks of both an authentication server and a ticket granting server under that protocol. The tickets issued by domain controller 108 are one example of credentials that can be used by client 102 when authenticating to servers using the techniques described herein. Other authentication schemes (and their corresponding tokens/credentials) can be used as applicable and the techniques described herein adapted accordingly.

An example of a client 102 is a laptop running a Windows® OS. Clients may also use other operating systems, and additional examples of clients include mobile communications devices and other handheld computing devices, as well as other types of information appliances such as desktop computers, set-top boxes, game consoles, and digital video recorders, as applicable.

In the example described by way of illustration in the following paragraph, server 110 is a print server, server 114 is a NetApp file server, and server 116 is an EMC Celerra file server. Both file servers support the Common Internet File System (CIFS) file sharing protocol; however, the techniques described herein may be used with other types of servers/protocols.

If client 102 presents an appropriate ticket (e.g., issued by domain controller 108) and authenticator (also referred to herein collectively as a "startup request") to print server 110, print server 110 will permit client 102 to send print jobs, delete print jobs, configure the print server, etc., commensurate with the privileges associated with the user (e.g., as a member of a basic user group, or an administrator group). One will appreciate that privileges may be limited, or "constrained," in order to prevent the user from accessing services beyond the user's privileges. In the example shown, server 110 is not virtualized, while servers 114 and 116 are. Nevertheless, prior to accessing any of servers 110, 114 or 116, client 102 may still require an appropriate ticket issued by domain controller 108, i.e. authentication. In an embodiment, domain controller 108 and all three servers may support the use of Kerberos for authentication. In an embodiment in which an authentication protocol other than Kerberos is used, client 102 may present authentication data comprising data other than and/or in addition to a Kerberos ticket and authenticator.

In an embodiment, storage virtualization system 112 (also referred to in the drawings and herein as virtualization device 112) is situated between clients 102-106 and servers 114-116. Among other things, storage virtualization system 112 serves as a bridge, and all client access to services provided by servers 114-116 goes through storage virtualization system 112. Other servers, such as web servers and mail servers, and/or supporting other protocols may also be virtualized, and the techniques described herein adapted accordingly.

B. Storage Virtualization System Authentication

Figure 2:
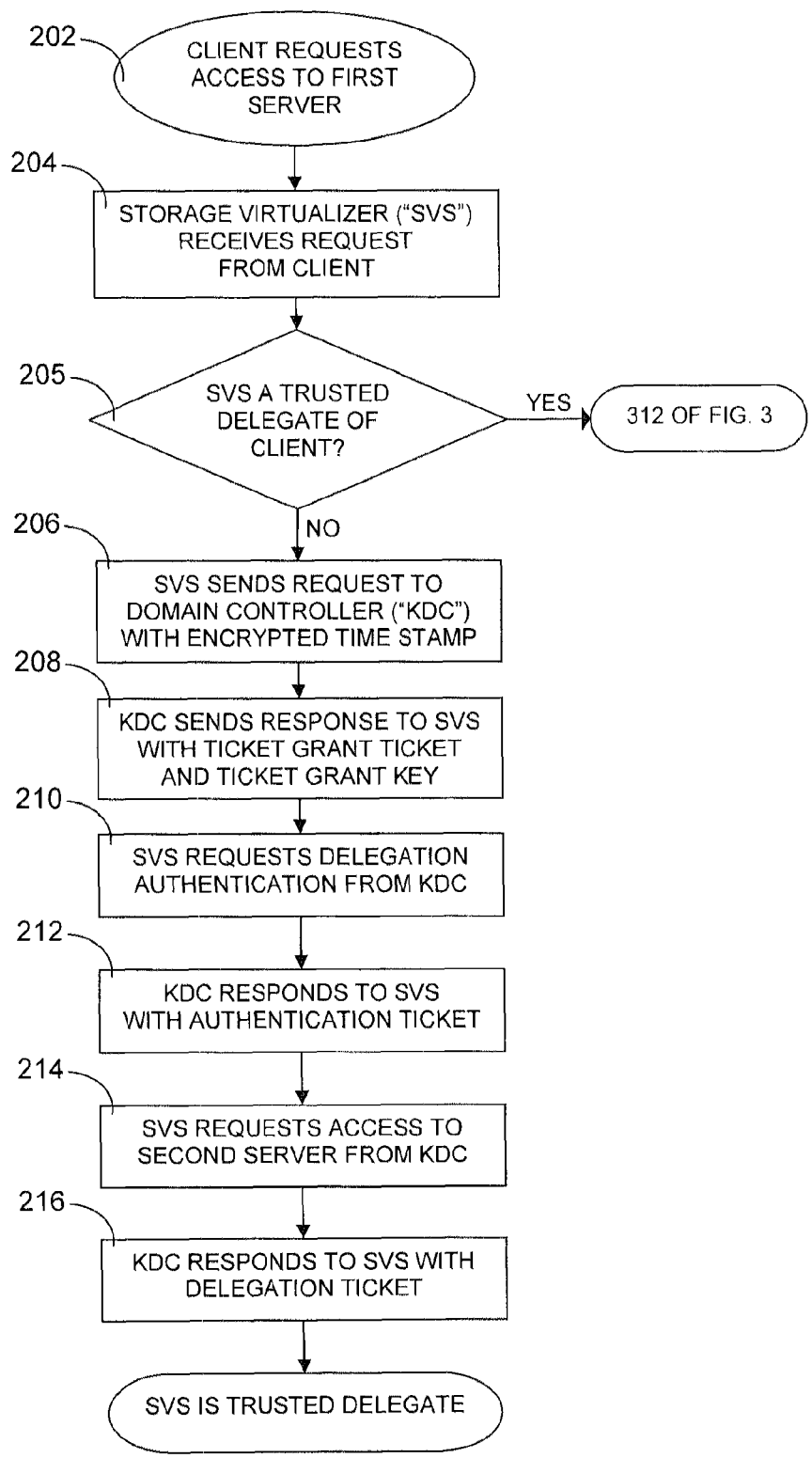
FIG. 2 is an exemplary flow diagram illustrating the steps of an embodiment of the invention.

FIG. 2 is a diagram depicting an embodiment of a method for authenticating a storage virtualization system so that it can act as a trusted delegate for a user. Performance of the method shown in FIG. 2 may require use of one or more of the elements shown in FIG. 1. FIG. 2 illustrates an example method of how storage virtualization system 112 forwards user requests from client 102 to server 116, which stores data that has been migrated from server 114 by storage virtualization system 112. In this example, server 114 requires user account authentication using the Kerberos protocol. Prior to migration, the user of client 102 will presumably be authenticated to access his or her own data stored on server 114. However, after migration, storage virtualization system 112 will need to be authenticated using the Kerberos protocol in order access the user's data in server 116, since storage virtualization system 112 bridges access between client 102 and server 116. In an embodiment, domain controller 108 authenticates storage virtualization system 112 and will provide the appropriate Kerberos ticket so that storage virtualization system 112 can access migrated files on server 116 on the user's behalf.

One having skill in the art will appreciate that once storage virtualization system 112 has been authenticated and trusted to communicate with server 116 on behalf of client 102, future re-direction of requests for access to server 116 will be seamless and transparent. In future transactions, storage virtualization system 112 will operate as a trusted delegate for the user in order to bridge the user's account between client 102 and server 116. One will appreciate that storage virtualization system 112 does not authenticate the user of client 102 prior to bridging access between client 102 and server 116. Storage virtualization system 112 depends upon server 114 to verify the user's identity. Storage virtualization system 112 will only act as a trusted delegate for client 102 after the client 102 authenticates to server 114 successfully. This ensures that if a malicious user sends a request directly to server 114 without authentication, the request will not be re-redirected to server 116.

One will appreciate that in an embodiment, the following method requires that domain controller 108 is configured with constrained delegation using protocol transition. Constrained delegation with protocol transition is a feature common to many Kerberos domain controllers on the market, such as Windows 2003 KDC. However, one will appreciate that other domain controllers may be configured differently. Here, domain controller 108 may store accounts for every client or server that relies upon domain controller 108 for authentication. Similarly, during the method described below, domain controller 108 will ultimately store an account for storage virtualization system 112. This account will be configured such that storage virtualization system 112 will have constrained delegation privileges to access server 116 on behalf of client 102, and that the Kerberos protocol used to authenticate storage virtualization system 112 will accept protocol transition. This configuration will enable domain controller 108 to accept alternate protocols (such as that used by storage virtualization 112), and will limit client 102's access to the user's requested data, rather than unsecured access to all data.

As shown at 202 of FIG. 2, a user operating client 102 attempts to access data on server 114, but this data has already been migrated to server 116 by storage virtualization system 112 ("SVS"). As shown in 204 of FIG. 2, the request from client 102 will be routed to storage virtualization system 112, which receives the request from client 102 for the purpose of re-directing the request to server 116. However, before re-directing the request, storage virtualization system 112 will need to be authenticated as a trusted delegate for the user of client 102 authorized to impersonate or act on the behalf of the user of client 102. Domain controller 108 is responsible for providing storage virtualization system 112 with the appropriate delegation ticket for the user of client 102. At 205, domain controller 108 may confirm whether or not storage virtualization system 112 is a trusted delegate for the user of client 102. If so, then storage virtualization system may re-direct access to server 116 (see 312 of FIG. 3). If not, then domain controller 108 will need to authenticate storage virtualization system 112. In this example, domain controller 108 is a Kerberos domain controller and, therefore, applies the Kerberos authentication protocol.

As shown in 206 of FIG. 2, storage virtualization system 112 sends a request command to domain controller 108 on the behalf of the user of client 102, requesting a Kerberos delegation ticket for the user of client 102. For example, storage virtualization system 112 may transmit the AS_REQ command, which may contain an encrypted time stamp. In response, domain controller 108 may verify the request from storage virtualization system 112 and may return an AS_REP response with a ticket granting ticket (TGT) containing a ticket granting server (TGS) key for storage virtualization system 112 (see 208 of FIG. 2). The TGS key also contains an encryption key, which storage virtualization system 112 obtains by decrypting the TGS key. One will appreciate that storage virtualization system 112 may use the TGS key to encrypt communications between itself and domain controller 108.

At 210 of FIG. 2, storage virtualization system 112 sends a TGS_REQ command to domain controller 108 encrypted with the TGS key from act 208. In the same transmission, storage virtualization system 112 may also send the user name of the user of client 102, domain name, and other information. One will appreciate that this may be called padata 129 or may form part of an S4U2Self extension. Domain controller 108 will understand from the TGS_REQ that storage virtualization system 112 is requesting delegation authentication. Furthermore, domain controller 108 will know that the TGS_REQ is coming from storage virtualization system 112 because it will contain the proper TGT and encryption from act 210.

At 212 of FIG. 2, domain controller 108 responds to the TGS_REQ with a TGS_REP with a Kerberos ticket and Privilege Attribute Certificate ("PAC") data, which may be included within the ticket. Then, at 214 of FIG. 2, storage virtualization system 112 is able to transmit a TGS_REQ to domain controller 108 in order to gain access to server 116 as an authenticated delegate for the user of client 102. One skilled in the art will appreciate that this is also known as an S4U2Proxy request, and may contain the identity of server 116 as the re-direction target, and client Kerberos ticket from act 212.

At 216 of FIG. 2, domain controller 108 responds with a TGS_REP and a proper ticket to enable storage virtualization system 112 to access server 116 as an authenticated delegate on behalf of the user of client 102, but constrained to only access the data that the user of client 102 is authorized to access. In future transactions, storage virtualization system 112 will be able to use this ticket to access server 116 seamlessly, since after act 216 of FIG. 2, storage virtualization system 112 is now properly authenticated as a trusted delegate for client 102. As will be discussed further below and illustrated in FIG. 3, when storage virtualization system 112 receives re-directs access to server 116 on behalf of the user of client 102, storage virtualization system 112 will be able to show its trusted delegate authority using the Kerberos ticket received with the TGS_REP response in act 216 of FIG. 2. One will appreciate that in future transactions, server 116 may also be unaware that storage virtualization system 112 is acting as a trusted delegate on the user's behalf, since delegation may be transparent to server 116 as well. One will also appreciate that after performance of the above method, storage virtualization system 112 is a trusted delegate for the specific user accessing server 116. Storage virtualization system 112 will not be a trusted delegate for the user to access other servers outside the user's privileges.

As previously discussed, storage virtualization system 112 may perform the method of the invention using any protocol, such as CIFS, NFSv4 or the like. However, one will appreciate that different protocols may require additional steps in order to identify storage virtualization system 112 as a trusted delegate for client 102. For example, the CIFS protocol may require that storage virtualization system 112 identify the user name for the user of client 102 who is attempting to access data migrated from server 114. The user name may be necessary so that storage virtualization system 112 can identify the delegated user in order to obtain the appropriate Kerberos ticket for that user (see act 210 of FIG. 2).

In an embodiment, storage virtualization system 112 may temporarily hold a first request from the user of client 102 to access its data on server 114. This data has already been migrated to server 116; however, the user's request may contain some of the information helpful for identifying the user name. Storage virtualization system 112 may not be able to simply decrypt the user's request to discover the user name. Instead, storage virtualization system 112 may use the connection between client 102 and server 114 to inject some new requests and create a new temporary file on server 114. From the perspective of server 114, it will appear as if the file is created by the user of client 102. Storage virtualization system 112 may then send a standard security description query such as NT_QUERY_SECURITY_DESC to analyze the security description of the newly created file. Server 114 will respond with the security description which includes security identity (SID) of the user of client 102 who appeared to create the file. In an embodiment, standard SMB or CIFS commands may be used to translate the SID to a user name, such as a LSALookupSID request or the like. In an embodiment, the SID can be translated into the user name of the user of client 102 using the method disclosed in U.S. patent application Ser. No. 11/906,026, incorporated in full herein. Once storage virtualization system 112 has the user name, it may then continue with the authentication process at 206 of FIG. 2 and described above. One will appreciate that the method for identifying the user name of the user of client 102 may vary among different protocols.

As a result of the methods described above and shown in FIG. 2, domain controller 108 will have a specific delegation account for storage virtualization system 112. An administrator with specific privileges for modifying the accounts authenticated by domain controller 108 may grant to the delegation account of storage virtualization system 112 constrained access to server 116. In this fashion, it ensures that the user is limited to only that user's data instead of using storage virtualization system 112 as a means to access other users' data. It also ensures that the user is limited to only a specified server in case storage virtualization system 112 is compromised and abuses the user's account and privileges.

C. Re-Direction

Figure 3:
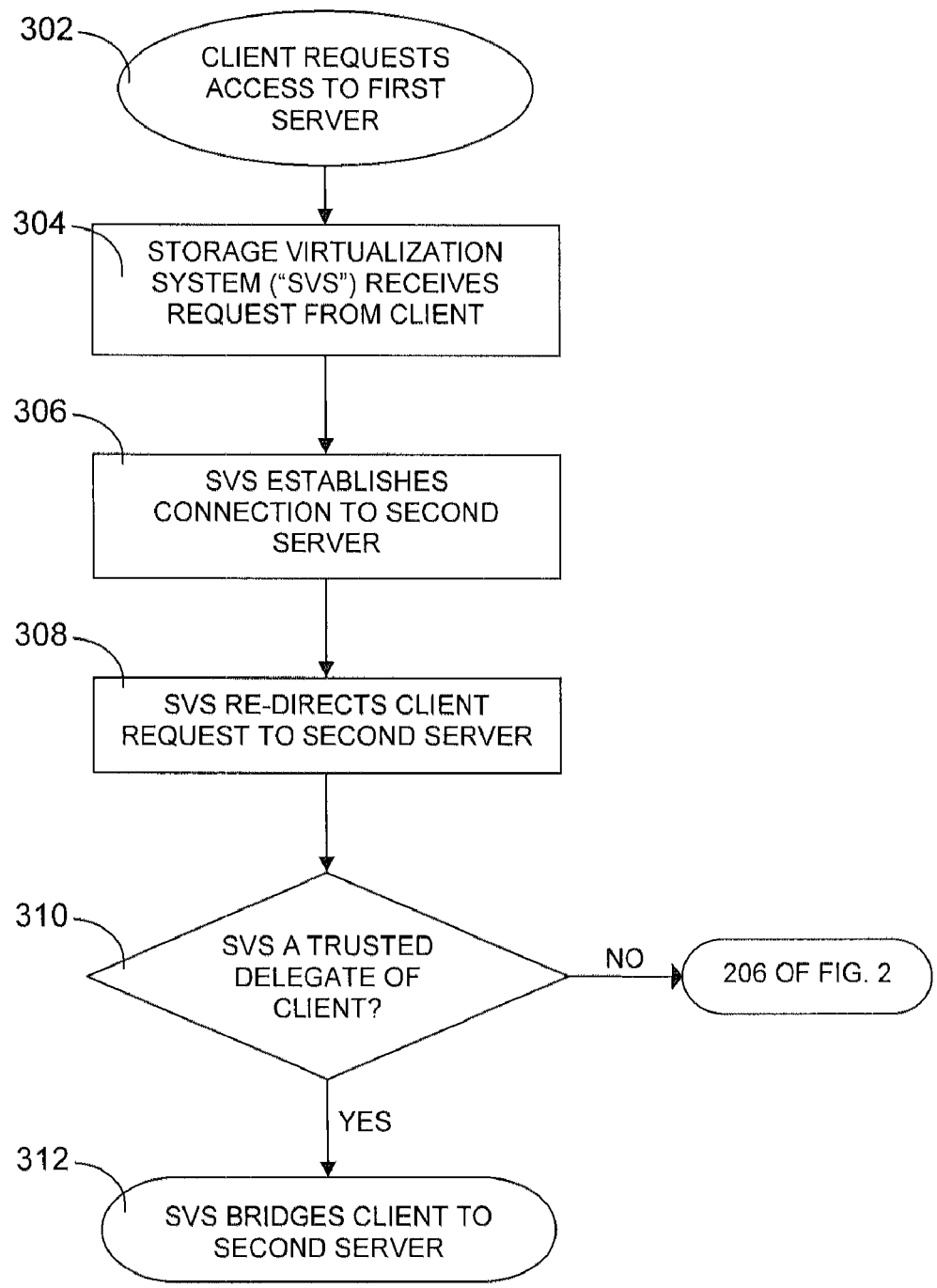
FIG. 3 is an exemplary flow diagram illustrating the steps of an embodiment of the invention.

FIG. 3 is a flowchart illustrating an embodiment of a method for accessing data by client 102 on server 116 using storage virtualization system 112 after it has been authenticated as a trusted delegate for the user of client 102. At 302 of FIG. 3, the user of client 102 requests access to server 114. At 304 of FIG. 3, the request from client 102 is received by storage virtualization system 112, which establishes a TCP or other socket connection with server 116 at 306 of FIG. 3, and forwards the request to server 116 at 308 of FIG. 3. At 310 of FIG. 3, domain controller 108 communicates with storage virtualization system 112 to confirm that storage virtualization system 112 is a trusted delegate. This act involves providing the appropriate delegation ticket for client 102 so that server 116 recognizes and accepts access from storage virtualization system 112. If storage virtualization system 112 is not a trusted delegate, then the method continues from act 206 of FIG. 2 to authenticate storage virtualization system 112 as a trusted delegate for the user of client 102. As previously discussed, when storage virtualization system 112 acts as a delegate for client 102, server 116 believes that it is being directly accessed by client 102, rather than a delegate for client 102. As such, delegation is not only transparent to the user of client 102, but also server 116. Once storage virtualization system 112's authority is confirmed, then at 312 of FIG. 3, storage virtualization system 112 bridges communications between client 102 and server 116.

One will appreciate that in the above examples, it is assumed that client 102, server 114 and server 116 are all located in the same domain. Alternatively, in an embodiment, the invention disclosed may also provide delegated access to migrated data on a server that is in a different domain from the client. For example, client 102 may be in one domain, and servers 114 and 116 may be in a different domain. As long as a two-way trusted domain relationship exists between the domain for client 102 and the domain for servers 114 and 116, storage virtualization system 112 may still be configured as a trusted delegate for re-directing requests from client 102 to server 116. This may require identification of the domain for server 116 so that the delegation account for storage virtualization system 112 uses the same domain as server 116. In order to delegate a user from a trusted domain to access server 116, during the initial authentication illustrated in FIG. 2 and described above, storage virtualization system 112 may need to issue additional Kerberos requests in order to receive the appropriate response for the user's domain, as well as the server's domain. For example, storage virtualization system 112 may issue TGS requests or S4U2Self requests, similar to methods for cross domain Kerberos authentication. However, if there is no previous trusted domain relationship between the domain for client 102 and the domain for servers 114 and 116, then the storage virtualization system 112 may have to apply the cross domain delegation method disclosed in U.S. patent application Ser. No. 11/906,026, which is incorporated in full herein.

In the description above and throughout, numerous specific details are set forth in order to provide a thorough understanding of the present invention. It will be evident, however, to one of ordinary skill in the art, that the present invention may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of the present invention. One will appreciate that these steps are merely exemplary and are not meant to be limiting in any way. Other steps and functions may be contemplated without departing from this disclosure or the scope of the present invention.

What is claimed is:

1. A method for authenticating a storage virtualization system comprising:
   migrating data from a first server to a second server using a storage virtualization system that is connected on a network to at least one client computer, the first server, the second server and a domain controller, wherein the domain controller authenticates access to data on the first and second servers, and wherein the client computer is authenticated by the domain controller to access the data on the first server; and
   requesting, by the storage virtualization system, authentication by the domain controller for access to the migrated data on the second server on behalf of the client computer.

2. The method of claim 1, wherein the domain controller authenticates the storage virtualization system using the Kerberos protocol.

3. The method of claim 2, wherein the domain controller authenticates the storage virtualization with constrained delegation enabled with protocol transition.

4. The method of claim 1, wherein requesting comprises:
   receiving, by the storage virtualization system, a request from the client to access the first server;
   creating, by the storage virtualization system, a file on the first server;
   requesting, by the storage virtualization system, security information for the file on the first server;
   receiving, by the storage virtualization system, a security identity for the file on the first server; and
   translating, by the storage virtualization system, the security identify for the file on the first server into a user name.

5. The method of claim 1, wherein the requesting step further includes:
   receiving, by the storage virtualization system, a request from the client computer to access the first server;
   obtaining, by the storage virtualization system, security information for the client computer from the connection between the client computer and the first server.

6. A method for communicating between a client and a server system using a storage virtualization system comprising:
   receiving, by the storage virtualization system, a request from the client to access data on a first server, wherein the data has been relocated from the first server to a second server by the storage virtualization system, and wherein access to the data is controlled by a domain controller; and
   re-directing, by the storage virtualization system, the request for access to the data to the second server, wherein the storage virtualization system is authorized to access the data on the second server as a trusted delegate of the client.

7. The method of claim 6, wherein the storage virtualization system is authorized using a Kerberos protocol.

8. The method of claim 7, wherein authorization is performed by a Kerberos domain controller having an account for the storage virtualization system configured with constrained delegation enabled with protocol transition.

9. The method of claim 6, further comprising:
obtaining, by the storage virtualization system, authentication from the domain controller to access the data after it has been relocated to the second server.

10. A computer program product, comprising a computer usable medium having a computer readable program code embodied therein, the computer readable program code adapted to be executed to implement a method for authenticating a storage virtualization system by a domain controller, the method comprising:
migrating data from a first server to a second server using a storage virtualization system that is connected on a network to at least one client computer, the first server, the second server and a domain controller, wherein the domain controller authenticates access to data on the first and second servers, and wherein the client computer is authenticated by the domain controller to access the data on the first server; and
requesting, by the storage virtualization system, authentication by the domain controller for access to the migrated data on the second server on behalf of the client computer.

11. The computer program product of claim 10, wherein the domain controller authenticates the storage virtualization system using the Kerberos protocol.

12. The computer program product of claim 11, wherein the domain controller authenticates the storage virtualization with constrained delegation enabled with protocol transition.

13. A computer program product, comprising a computer usable medium having a computer readable program code embodied therein, the computer readable program code adapted to be executed to implement a method for accessing a server by a trusted storage virtualization system, the method comprising:
receiving, by the storage virtualization system, a request from the client to access data on a first server, wherein the data has been relocated from the first, server to a second server by the storage virtualization system, and wherein access to the data is controlled by a domain controller; and
re-directing, by the storage virtualization system, the request for access to the data to the second server, wherein the storage virtualization system is authorized to access the data on the second server as a trusted delegate of the client.

14. The computer program product of claim 13, wherein the storage virtualization system is authorized using a Kerberos protocol.

15. The computer program product of claim 14, wherein authorization is performed by a Kerberos domain controller having an account for the storage virtualization system configured with constrained delegation enabled with protocol transition.

\* \* \* \* \*